May 5, 1970          J. C. PRISCU          3,510,077

SIZING SHEAR

Filed June 19, 1967          3 Sheets-Sheet 1

INVENTOR.
John C. Priscu
BY
HIS ATTORNEYS

INVENTOR.
John C. Priscu
BY
HIS ATTORNEYS

INVENTOR.
John C. Priscu
BY
HIS ATTORNEYS 3,510,077
SIZING SHEAR
John C. Priscu, Las Vegas, Nev., assignor to Titanium
Metals Corporation of America, New York, N.Y., a
corporation of Delaware
Filed June 19, 1967, Ser. No. 647,004
Int. Cl. B02c 18/06, 13/02
U.S. Cl. 241—241                                    5 Claims

ABSTRACT OF THE DISCLOSURE

A rotary type shear having an adjustable stationary shear member including a blade and a rotary shear member including a drum and a plurality of curved blades mounted on the drum. A plurality of spaced material holding claw members located adjacent the cutting edge of each curved blade for forcing material between the blade and the blade of the stationary shear member during rotation of the drum.

---

This invention relates to a rotary type shear and more particularly to a shear for shearing relatively ductile materials including claw members for forcing irregularly shaped large chunks of material between the blades of the shear members.

My invention provides a heavy duty rotary type shear for reducing the size of chunks of material such as metal sponge produced from the reduction of ore. These chunks are irregular in shape and relatively ductile and must be reduced in size for further processing. The metal sponge resulting from reduction is often contaminated with chemicals used in reducing the ore such as magnesium and magnesium chloride which are used in the Kroll process for manufacturing titanium sponge, and these chemicals must be removed from the sponge prior to further processing. Removal of contaminants is accomplished by distillation, leaching and other methods of chemical extraction; and it is desirable to reduce the size of the chunks of metal sponge while maintaining the porosity thereof prior to decontamination. It is also desirable to reduce the size of the chunks of metal sponge for testing to determine metal quality and for blending with alloying agents. After the alloying agents are added, the metal is compacted into electrodes for melting into ingots.

Metal sponge is presently reduced in size by crushers or hammer mills which greatly decrease the porosity of the metal particles thereby making the product difficult to decontaminate and to compact into electrodes. Additionally, it is difficult to process metal sponge by crushing since it is a relatively ductile material having no specific cleavage lines and low friability. It has been found advantageous to subject the metal sponge to a shearing action rather than to a crushing action since the porosity of the sponge may be maintained.

The shear of my invention is provided with an adjustable stationary shear member and a rotary shear member. The rotary shear member includes a drum carrying blades which have a slight curvature so that they approach the blade on the stationary member at an angle as the drum rotates to provide a slicing motion which minimizes both the impact on the material and the torque requirement of the shear. Each of the curved blades is formed with a hardened cutting edge, and a plurality of spaced claw members are located along the cutting edge to prevent irregularly shaped chunks from being forced from between the blade on the drum and the stationary blade as the drum rotates. The claw members permit uninterrupted operation of the shear when processing irregularly shaped chunks of relatively ductile material.

Figure 1:
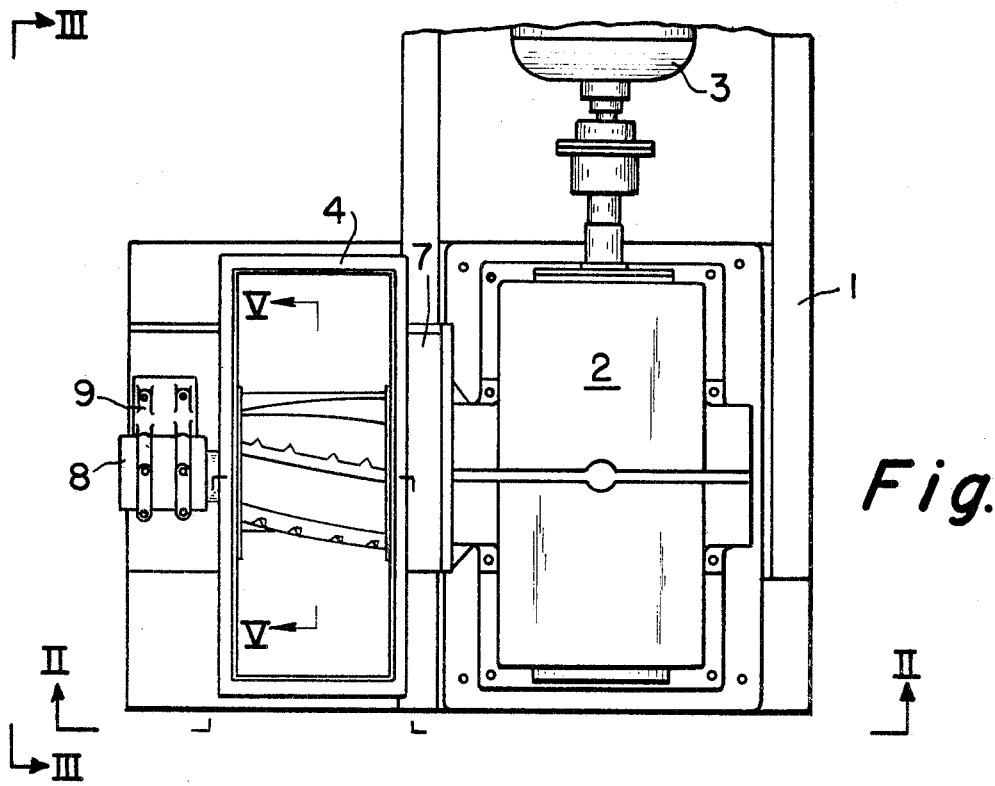
Figure 2:
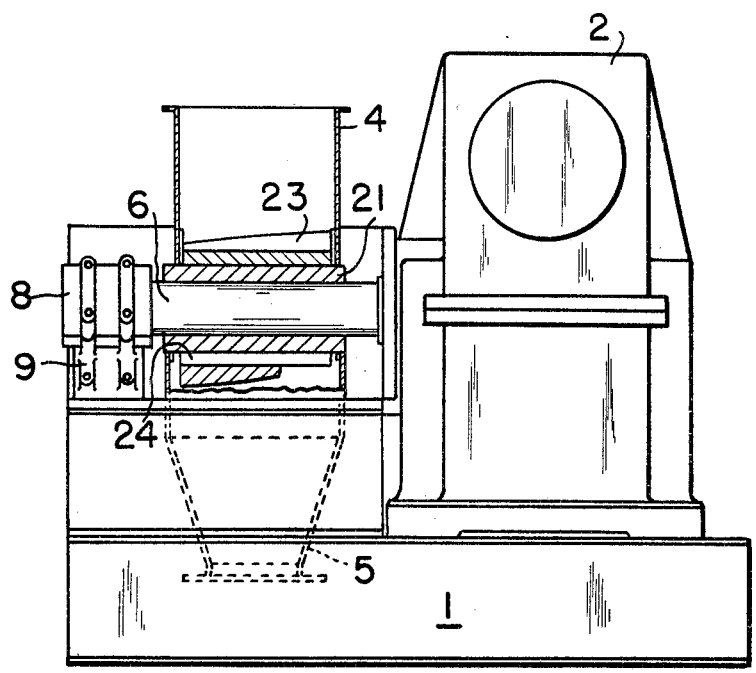
Figure 3:
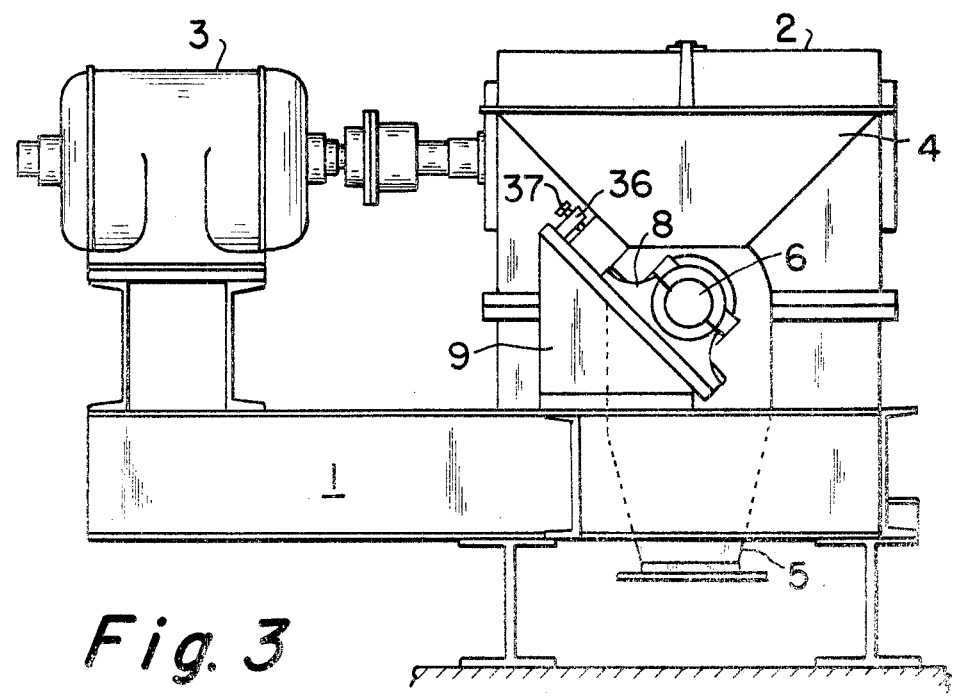
Figure 4:
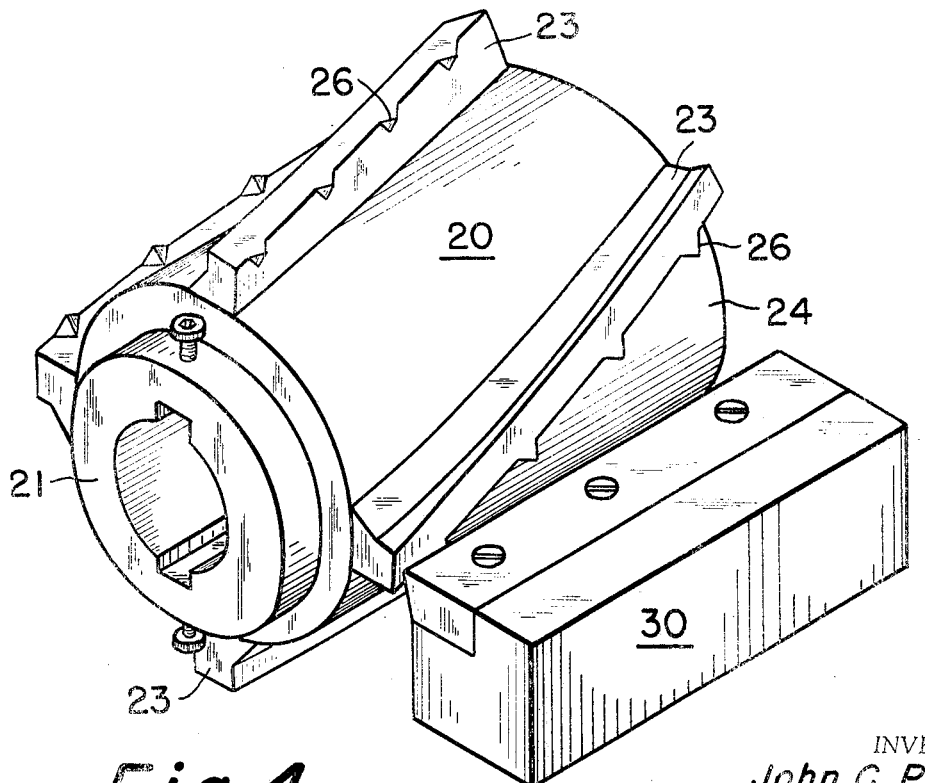
Figure 5:
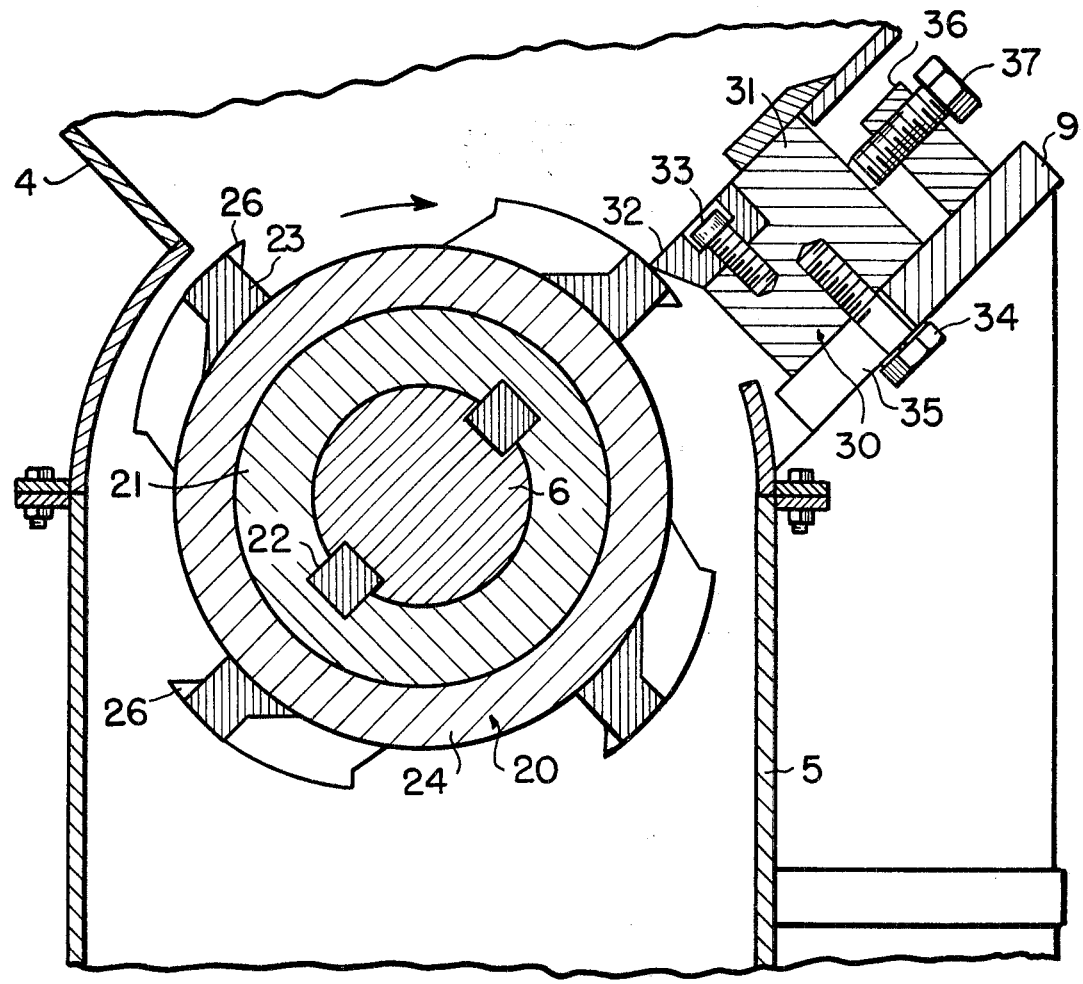

In the accompanying drawings, I have shown a preferred embodiment of my invention in which:
 FIG. 1 is a plan view of the shear;
 FIG. 2 is a section on line II—II of FIG. 1;
 FIG. 3 is an elevation on line III—III of FIG. 1;
 FIG. 4 is a perspective view of the rotary shear member and stationary blade; and
 FIG. 5 is a section on line V—V of FIG. 1.

Referring to the drawings, the shear includes a frame 1, a gear reducer 2 and an electric motor 3 for driving a shaft 6 carrying the rotary shear member through the gear reducer. Material to be sheared is supplied to the shear members by a material feed hopper 4, and the sheared material passes from the shear members by gravity into a discharge chute 5 from which it is supplied to suitable material handling means. Shaft 6 carrying rotary shear member 20 is supported at one end by a bearing 7 carried by the gear reducer and at its opposite end by a pillow block 8 which is supported on a mounting assembly 9. The rotary shear member includes a cylinder 21 supported on shaft 6 by keys 22 and cooperating keyways and a drum 24 which may be welded or force fitted on cylinder 21 and which rotates with the cylinder. Although I have shown drum 24 mounted on cylinder 21 which is mounted on shaft 6, it is to be understood that the drum may be mounted directly on its drive shaft. A plurality of curved blades 23 extend throughout the length of drum 24 and are mounted on the drum at an angle in respect of a radial plane passing through the axis of the drum. It has been found that an angle of about five degrees is preferred in order to insure that a slicing or shearing action will take place between blades 23 and the blade on the stationary shear member. Each blade on the rotary shear member is hardened at its leading or cutting edge, and a plurality of spaced claw members 26 extend from the cutting edge of each blade. The claw members prevent large irregularly shaped pieces of ductile material from being forced from between the blades of the shear members as the rotary member rotates to move the curved blades past the stationary blade. Since the shear is intended to process relatively ductile material, irregular pieces would tend to slide along the blades as the rotary member rotates and at the end of the blades would either jam the shear or kick out from between the blades and such is prevented by the claw members.

Stationary shear member 30 comprises a mounting block 31 and a blade 32 attached to the block by screws 33. Alternatively, the blade could be eliminated and a hardened cutting edge formed directly on block 31 along the exposed corner thereof. Regardless of how it is formed, the stationary blade should have a slight relief to facilitate clearance of sheared material. The mounting block is adjustably attached to an extension of mounting assembly 9 as shown in FIGS. 3 and 5 by screws 34. The screws extend through slots 35 in the assembly into threaded holes in block 31 so that the block may be moved relative to assembly 9 to vary the spacing between the cutting edges of blades 23 and 32. Adjusting means for the stationary shear member are provided in the form of lugs 36 welded to assembly 9, and screws 37 extending through threaded openings in the lugs to contact the rear face of block 31. Rotation of the screws forces the mounting block toward the axis of the rotary shear member and thereby decreases the spacing between the cutting edges of blades 23 and blade 32. When the blade of the stationary shear member is adjusted to the proper spacing, screws 34 are tightened to hold the mounting block in position.

In operation, material is supplied to hopper 4 and passes from the open bottom of the hopper onto the rotary shear member. As the rotary shear member turns in the direction of the arrow in FIG. 5, blades 23 carry the material to the stationary shear member; and as the material is forced past stationary blade 32, the cutting edges of the blades slice the material. Claw members 26 ensure that all pieces are sliced by the cutting edges as any material which tends to slide along the blades will be stopped when it contacts a claw member at which point it will be forced toward the stationary blade by the rotary blade and will be subjected to a shearing action. The sheared material drops from between the blades into chute 5 and passes out of the shear. The material which passes from discharge chute 5 will be of a size to be further reduced in size by shearing, and the shear of my invention may be used in conjunction with other shears to produce porous material of the desired particle size.

My invention has important features which makes it capable of subjecting irregularly shaped pieces of ductible material to a true shearing or slicing action with a minimum of compaction. It is important that metal sponge not be compacted any more than necessary, and it has been found that sponge treated by crushers and hammer mills is compacted to such an extent during sizing that it loses its porosity. The use of my shear makes it possible to slice relatively large pieces of ductible material having irregular shapes since the claw members force the material between the shear blades.

While I have not shown and disclosed a preferred embodiment of my invention, it is to be understood that it may otherwise be embodied within the scope of the appended claims.

I claim:

1. A shear for reducing the size of chunks of material comprising a rotary shear member, driving means operatively connected with said rotary member for rotating said member, a stationary shear member and a hopper for supplying material to said shear members; said rotary shear member including a drum having a plurality of curved blades mounted on its exterior surface and extending throughout its length and cutting edges formed on the leading edge of each of said blades; said stationary shear member including a stationary blade having a smooth continuous cutting edge and means adjustably supporting said blade for movement relative to said rotary shear member, whereby material from said hopper is supplied to said shear members and is carried by said curved blades to said stationary blade to be sheared by the combined action of the cutting edges of said curved blades and said stationary blade.

2. A shear as set forth in claim 1 wherein each of said curved blades is mounted on the surface of said drum at an angle of about 5° to a radial plane passing through the axis of said drum.

3. A shear as set forth in claim 1 including a plurality of claw members spaced along and extended forwardly of the leading edge of each of said curved blades, said claw members adapted to force irregularly shaped chunks of ductile material between said curved blades and said stationary blade as said rotary shear member rotates.

4. A shear as set forth in claim 1 wherein said means supporting said stationary blade includes a mounting assembly having a plate with a plurality of slots formed therein, a mounting block carrying said blade at its inner edge and resting on said plate, a screw extending through each of said slots into a threaded hole in the bottom of said mounting block and means for moving said block relative to said plate to vary the distance between the cutting edges of said curved blades and said stationary blade.

5. A shear as set forth in claim 4 wherein said means for moving said block includes a plurality of lags extending upwardly from said plate and located adjacent the outer end of said block, a threaded hole formed in each lug and an adjusting screw threaded in each of said holes with its inner end contacting the outer end of said block, whereby rotation of said screws forces said block away from said lugs and toward the axis of said drum to vary the distance between the cutting edges of said blades.

References Cited

UNITED STATES PATENTS

| | | | |
|---|---|---|---|
| 864,552 | 8/1907 | Perkins | 241—242 X |
| 2,216,612 | 10/1940 | Dimm | 241—241 X |
| 2,224,948 | 12/1940 | Bloomquist | 241—241 |
| 2,381,775 | 8/1945 | Roddy | 241—241 X |

FOREIGN PATENTS

| | | |
|---|---|---|
| 606,994 | 12/1934 | Germany. |
| 409,611 | 5/1934 | Great Britain. |

ROBERT C. RIORDON, Primary Examiner

DONALD G. KELLY, Assistant Examiner